(12) United States Patent
Chen et al.

(10) Patent No.: US 9,517,755 B1
(45) Date of Patent: Dec. 13, 2016

(54) AUTONOMOUS BRAKING SYSTEM AND AUTONOMOUS BRAKING METHOD

(71) Applicant: Automotive Research & Testing Center, Changhua County (TW)

(72) Inventors: Shun-Hung Chen, Changhua County (TW); Jiun-Jie Chen, Changhua County (TW); Liang-Cheng Chang, Changhua County (TW)

(73) Assignee: Automotive Research & Testing Center, Changhua County (TW)

( * ) Notice: Subject to any disclaimer, the term of this patent is extended or adjusted under 35 U.S.C. 154(b) by 84 days.

(21) Appl. No.: 14/720,843

(22) Filed: May 25, 2015

(51) Int. Cl.
  *B60T 7/22* (2006.01)
  *B60T 8/172* (2006.01)

(52) U.S. Cl.
  CPC . *B60T 7/22* (2013.01); *B60T 8/172* (2013.01)

(58) Field of Classification Search
  CPC .................................. B60T 7/22; B60T 8/172
  USPC .......................................................... 701/70
  See application file for complete search history.

(56) References Cited

U.S. PATENT DOCUMENTS

| | | | |
|---|---|---|---|
| 6,021,375 A | 2/2000 | Urai et al. | |
| 6,084,508 A | 7/2000 | Mai et al. | |
| 6,517,172 B1 | 2/2003 | Bond, III et al. | |
| 7,592,945 B2 * | 9/2009 | Colburn | G01C 9/00 342/118 |
| 7,607,741 B2 | 10/2009 | Seto et al. | |
| 8,146,703 B2 | 4/2012 | Baumann et al. | |
| 8,260,538 B2 | 9/2012 | Noda et al. | |
| 2008/0312834 A1* | 12/2008 | Noda | B60T 7/22 701/301 |
| 2009/0002222 A1* | 1/2009 | Colburn | G01C 9/00 342/145 |
| 2015/0251664 A1* | 9/2015 | Zagorski | B62D 6/003 701/41 |

FOREIGN PATENT DOCUMENTS

| | | |
|---|---|---|
| TW | I356011 B | 1/2012 |
| TW | 201422743 A | 6/2014 |

* cited by examiner

*Primary Examiner* — Anne M Antonucci
(74) *Attorney, Agent, or Firm* — CKC & Partners Co., Ltd.

(57) ABSTRACT

An autonomous braking system includes a detecting module, a tracing module, a collision path prediction module, a memory register, a collision time prediction module and a decision module. The detecting module recognizes multiple objects located ahead of a vehicle, and then the tracing module traces the moving objects. The collision path prediction module is used to obtain a possible collision range and a non-collision range. The memory register records the coordinate of the objects located within the possible collision range. When one of the objects moves out of the possible collision range, its data is instantaneously removed from the memory register. The collision time prediction module predicts a collision time between the vehicle and each of the objects. The decision module determines if a brake assist is activated in accordance with the collision time.

15 Claims, 5 Drawing Sheets

AUTONOMOUS BRAKING SYSTEM AND AUTONOMOUS BRAKING METHOD

BACKGROUND

Technical Field

The present disclosure relates to an autonomous braking system and an autonomous braking method. More particularly, the present disclosure relates to an autonomous braking system and an autonomous braking method that can detect multiple objects beforehand, and avoid vehicle collision while lane changing.

Description of Related Art

The reaction of a driver is not sufficient to handle an increasingly complicated driving environment, and thus driving safety is dramatically dependent on the reaction capability of each individual driver. A driving assistant system has been developed to increase the driving safety. Such driving assistant system provides an automatic braking capability for a vehicle, which is independent of the driver's controllability. For example, the driving assistant system provides sufficient actuation force to lower the speed of the vehicle or even to fully stop the vehicle for avoiding the collisions between the vehicles.

The aforementioned driving assistant system generally uses a sensor to detect a distance between the vehicles, and uses a processing unit to obtain the distance signal and the relative speed between the vehicles, and then transfers the results to a controlling unit to control the speed of the vehicle or to brake the vehicle to keep a distance between the vehicle and another object in front the vehicle or to completely stop the vehicle. In another example, the vehicle may be automatically swerved when the distance between the vehicle and the object or the speed of the vehicle reaching a critical value.

However, the aforementioned driving assistant system usually suffers functionality failure in extreme situations. For example, when the speed difference between the vehicles is too large or the distance difference between the vehicles is too short, due to the mechanism or the disposing position of the sensor, the response of the sensor cannot be activated instantaneously, and thus autonomous braking or lowering speed of the vehicle cannot be performed instantaneously, thus leading to vehicle collisions.

The aforementioned issues usually happen in changing lanes. If the driver of the vehicle changes lane, the sensor needs to be rebooted to reset the driving assistant system after the steering wheel is repositioned. When the vehicle speed is too large (larger than 30 kph), the response of the sensor is not fast enough, and the braking assistance functionality of the vehicle cannot work properly to keep enough distance difference for the vehicle, thus leading to vehicle collisions. In other words, the aforementioned driving assistant system can only be used in a front direction of the vehicle and at a low vehicle speed.

Therefore, there is need for a manufacturer to develop a driving assistant system that can be applied in various situations.

SUMMARY

According to one aspect of the present disclosure, an autonomous braking system is provided. The autonomous braking system includes a detecting module, a tracing module, a collision path prediction module, a memory register, a collision time prediction module and a decision module. The detecting module is configured to detect and recognize one or more objects located ahead of a vehicle. The tracing module is configured to trace the one or more objects which are dynamically moving. The collision path prediction module is configured to predict a collision path between the vehicle and the one or more objects in accordance with a vehicle dynamic message, and to define a possible collision range and a non-collision range in accordance with the collision path and a position of each of the one or more objects. The memory register is configured to record one or more coordinate positions of the one or more objects which are located within the possible collision range, wherein when multiple objects are located within the possible collision range, one or more coordinate positions of the one or more objects are recorded in the memory register at the same time; and when one of the one or more objects which are originally located within the possible collision range moves out of the possible collision range, its data is removed from the memory register. The collision time prediction module is configured to predict a collision time between the vehicle and each of the one or more objects. The decision module is configured to determine if a brake assist is activated in accordance with the collision time.

According to another aspect of the present disclosure, an autonomous braking method is provided. The autonomous braking method includes: detect and recognize one or more objects located ahead a vehicle; trace one or more objects by a tracing module; define a collision path in accordance with a vehicle dynamic message by a collision path prediction module; define a possible collision range and a non-collision range in accordance with the collision path and a position of each of the one or more objects; if one or more object are located within the possible collision range, use a memory register to record the coordinate of each object, and predict a collision time by a collision time prediction module; if one object is originally located within the possible collision range, but moves out of the possible collision range and is located within the non-collision range later, then remove its related data from the memory register; analyze the collision time between the vehicle and the object located in a front lane of the vehicle by a decision module, and use the decision module to determine to provide a warning signal, to pre-brake the vehicle or to automatically brake the vehicle in accordance with different extent of emergency; if the vehicle is changed to a side lane, and the object located in the side lane and in front of the vehicle is also located within the possible collision range, then use the prediction module to determine to provide a warning signal, to pre-brake the vehicle or to automatically brake the vehicle in accordance with the collision time between the vehicle and the object and different extent of emergency.

BRIEF DESCRIPTION OF THE DRAWINGS

The present disclosure can be more fully understood by reading the following detailed description of the embodiment, with reference made to the accompanying drawings as follows.

DETAILED DESCRIPTION

Figure 1:
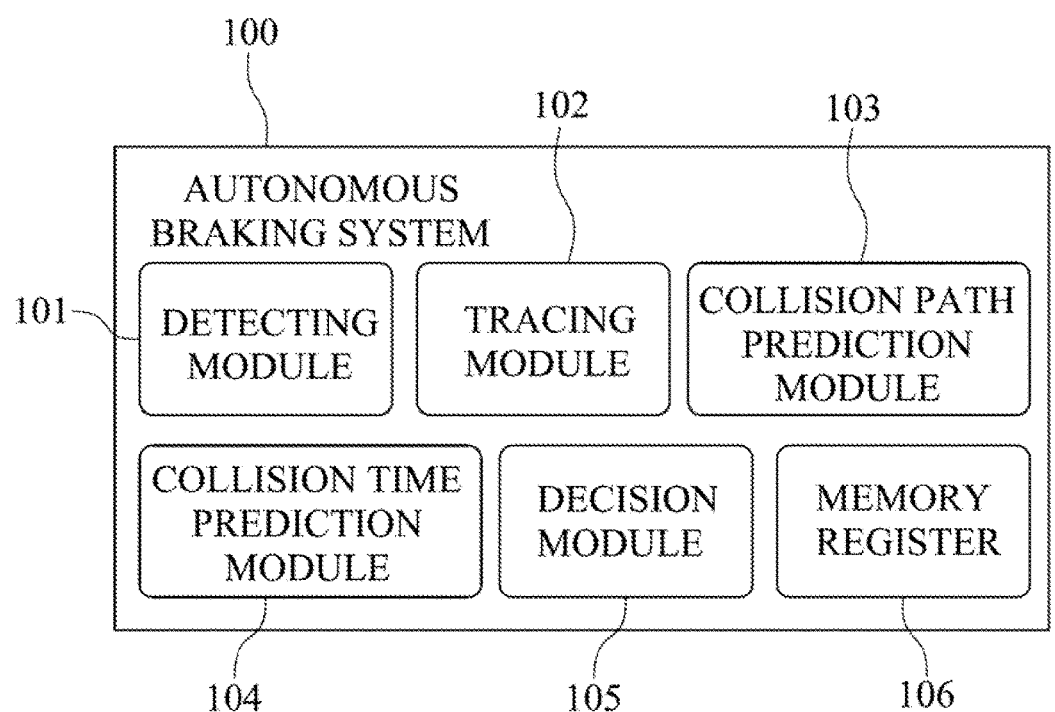
FIG. 1 is a schematic view showing an autonomous braking system according to one embodiment of the present disclosure.

Reference will now be made in detail to the present embodiments of the disclosure, examples of which are illustrated in the accompanying drawings. Wherever possible, the same reference numbers are used in the drawings and the description to refer to the same or like parts.

FIG. 1 is a schematic view showing an autonomous braking system 100 according to one embodiment of the present disclosure.

The autonomous braking system 100 includes a detecting module 101, a tracing module 102, a collision path prediction module 103, a collision time prediction module 104 and a decision module 105.

The detecting module 101 is used to detect and recognize multiple objects located ahead of a vehicle, and to determine one or more kinds to which the objects belong. For example, the object may be a pedestrian, a car, a motorcycle or a bike. The detecting range of the detecting module 101 includes a range of parts of the vehicle which are likely to be touched when the vehicle is moving forward, such as a vehicle body, a side mirror or a bumper.

The tracing module 102 can be used to trace and locate the objects for obtaining the coordinate positions of the objects when the objects are dynamically moving.

The collision path prediction module 103 is used to define a collision path in accordance with a vehicle dynamic message, and to define a possible collision range and a non-collision range in accordance with the collision path and the coordinate position of each object.

The collision time prediction module 104 is used to predict a collision time between each object and the vehicle when one or more objects are located within the possible collision range.

The decision module 105 is used to determine what kinds of emergency actions should be taken. For example, the emergency actions can be such as providing a warning signal, pre-braking the vehicle or automatically braking the vehicle.

The autonomous detecting system 100 also includes a memory register 106. When one or more objects are located within the possible collision range, the coordinate position of each object is recorded in the memory register 106. When an object is originally located in the non-collision range, then its related data is not recorded. Furthermore, if an object is originally located within the possible collision range but moves out of the possible collision range later, then its data is removed from the memory register 106. In other word, data of each object located within the possible collision range is recorded. Therefore, the autonomous detecting system 100 is capable of achieving instantaneous responses in extreme emergency situations (e.g. vehicle speed is too high or vehicle distance is too short) without requiring to reboot the autonomous detecting system 100. Furthermore, data of each object located within the non-collision range is not recorded, thus reducing consumption of the system resources, and increasing the response speed of the system.

The detecting module 101 may have various application types. Simply detecting the depth (distance) or image cannot meet the requirements in a more complicated driving environment. Accordingly, in the present disclosure, at least two possible examples of the detecting module 101 are introduced herein, referring to FIG. 2 and FIG. 3 respectively.

Figure 2:
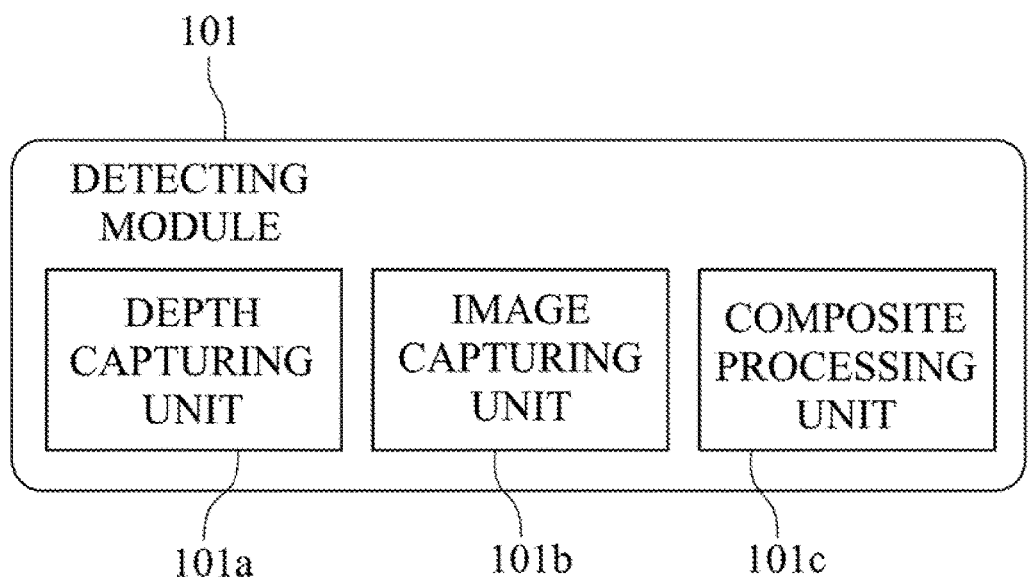
FIG. 2 is a schematic view showing a detecting module of FIG. 1 using a depth capturing unit combined with an image capturing unit.
Figure 3:
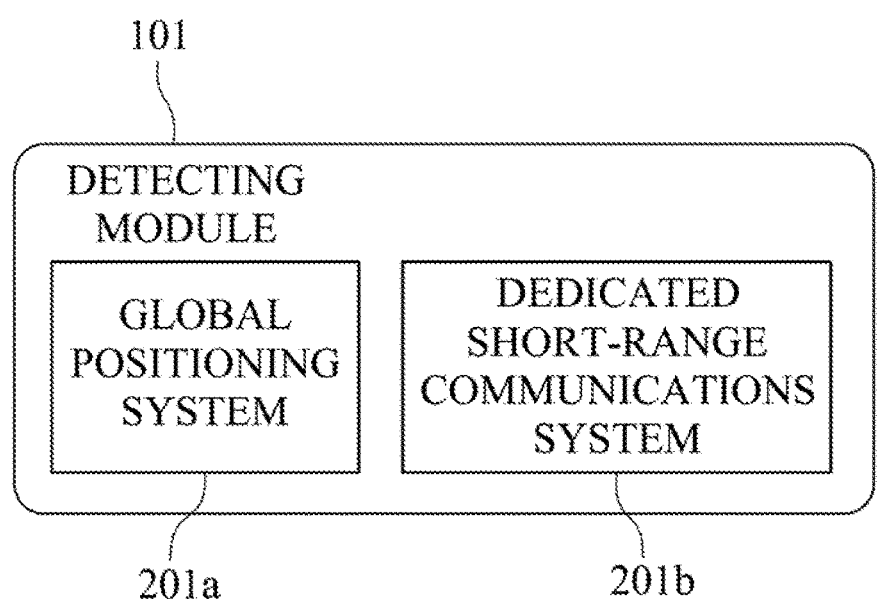
FIG. 3 is a schematic view showing the detecting module of FIG. 1 using a GPS combined with a DSRC.

FIG. 2 is a schematic view showing the detecting module 101 of FIG. 1 using a depth capturing unit 101a combined with an image capturing unit 101b; and FIG. 3 is a schematic view showing the detecting module 101 of FIG. 1 using a GPS 201a combined with a DSRC 201b.

In FIG. 2, the detecting module 101 combines a depth capturing unit 101a and an image capturing unit 101b. The depth capturing unit 101a is used to detect the object to obtain spatial information (e.g. the distance and the coordinate position). The image capturing unit 101b is used to capture the images of the object, and then recognize the images to obtain image feature information. The detecting module 101 further uses a composite processing unit 101c to receive the spatial information and the image feature information, and to perform a scoring scheme to determine which kinds of the objects are. The recognition rate can be increased when the depth and the image of the object are combined.

In FIG. 3, the detecting module 101 combines a GPS 201a and a DSRC 201b. The latitude and longitude coordinates of each vehicle (herein, the object is a vehicle) can be obtained through the GPS 201a disposed in the vehicle. Then, the DSRC is used to transmit messages between vehicles, and thus the relative position, the relative distance, the relative angle and the relative speed between the vehicles can also be obtained. By using the aforementioned method, the safety relationship between vehicles can be obtained. More detail descriptions of combining the GPS and the DSRC can be referred to TW Patent Serial No. I356011B1, which is incorporated by reference herein.

The aforementioned tracing module 102 can trace the objects that are dynamically moving and obtain the positions of the objects through an Extended Kalman Filter. The movements of the objects are not limited to linear movements, and may be non-linear movements. For obtaining accuracy dynamic messages of the objects (e.g. a relative distance or a relative angle between the object that are dynamically moving and the vehicle), the Extended Kalman Filter can be represented by the following formulas:

$$A = \begin{bmatrix} 1 & 0 & 0 & \cos(\varphi) \times \Delta t \\ 0 & 1 & 0 & \sin(\varphi) \times \Delta t \\ 0 & 0 & 1 & 0 \\ 0 & 0 & 0 & 1 \end{bmatrix}; \hat{x}_{i-1} = \begin{bmatrix} xp_i \\ yp_i \\ \varphi_i \\ v_i \end{bmatrix}; \text{ and } \hat{x}_k^- = A\hat{x}_{i=1};$$

where, $xp_i$ is an x coordinate of the one or more objects which are dynamically moving;

$yp_i$ is a y coordinate of the one or more objects which are dynamically moving;

$v_i$ is a speed of the one or more objects which are dynamically moving;

$\varphi_i$ is a moving direction of the one or more objects which are dynamically moving;

$\Delta t$ is sampling time of a continuous relative position between the vehicle and the one or more objects which are dynamically moving; and A is a state transformation model of the one or more objects which are dynamically moving.

More details of the aforementioned Extended Kalman Filter can refer to TW Patent Publication No. 201422473A, which is incorporated by reference herein.

The aforementioned vehicle dynamic message is used to obtain the collision path. The collision path at left side and right side of the vehicle can be represented by the following formulas:

$$y_l(t)=\alpha_l x_l^2(t)+\beta_l x_l(t)+\epsilon_l+y_{l0}; \text{ and}$$

$$y_r(t)=\alpha_r x_r^2(t)+\beta_r x_r(t)+\epsilon_r+y_{r0};$$

where,
$x_i$, i=l, is a horizontal position at left side of the vehicle;
$x_i$, i=r, is a horizontal position at right side of the vehicle;
$y_i$, i=l, is a vertical position at left side of the vehicle;
$y_i$, i=r, is a vertical position at right side of the vehicle;
$\alpha_l$, i=l, is a lateral speed at left side of the vehicle;
$\alpha_r$, i=r is a lateral speed at right side of the vehicle;
$\beta_l$, i=l, is a lateral acceleration speed at left side of the vehicle; and
$\beta_r$, i=r is a lateral acceleration speed at right side of the vehicle.

The collision range can be represented by the following formula:

$$y_{obs}^{(i)} > y_l(t) \cap y_{obs}^{(i)} > y_r(t) \cap x_{obs}^{(i)} > x_l \cap x_{obs}^{(i)} < x_r;$$

where,
$x^{(i)}_{obs}$, and $y^{(i)}_{obs}$ are a horizontal position and a vertical position of each of the one or more objects respectively; and i=1, 2, . . . is the ith object.

Figure 4:
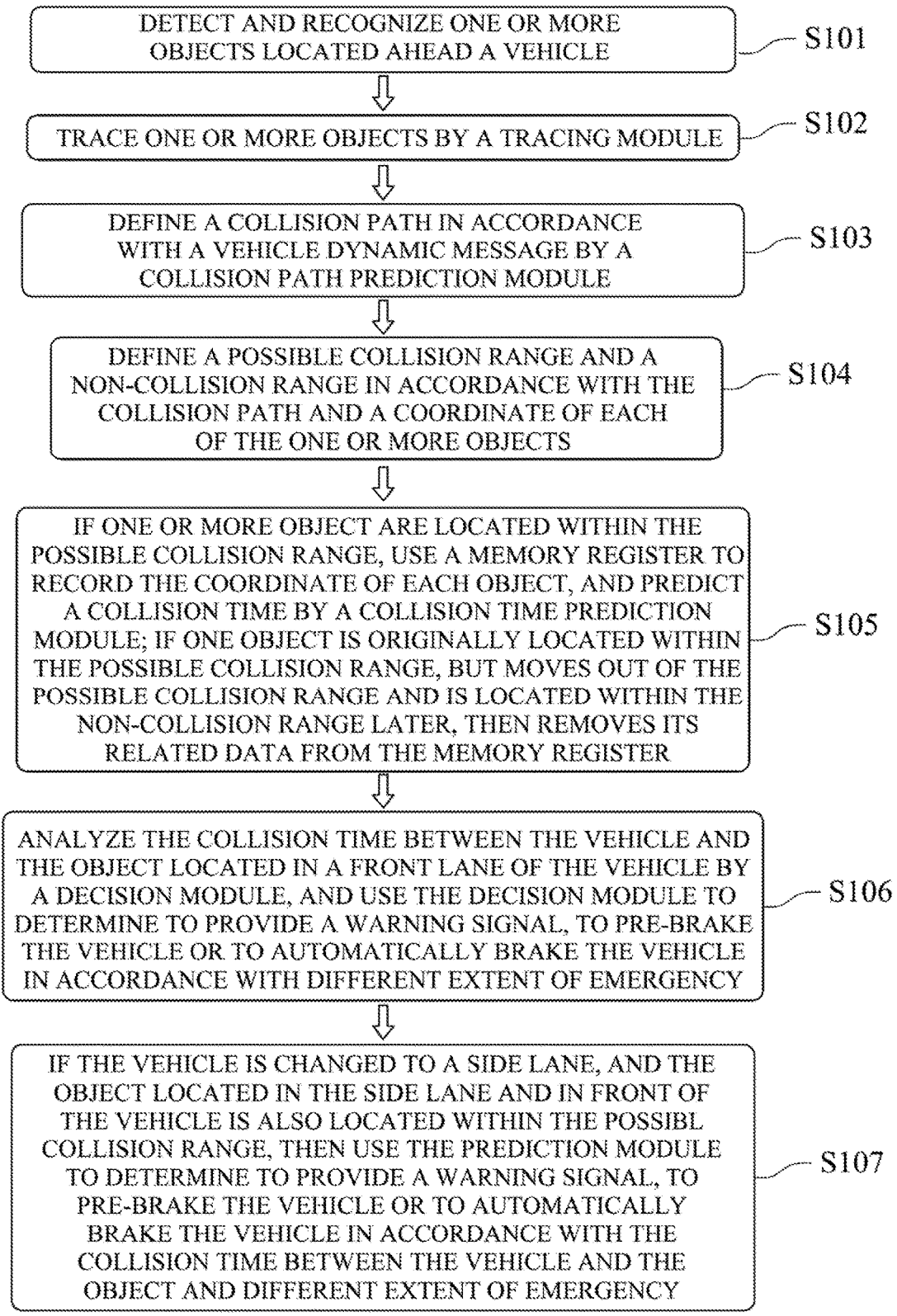
FIG. 4 is a flow chart showing an autonomous braking method according to one embodiment of the present disclosure.

FIG. 4 is a flow chart showing an autonomous braking method according to one embodiment of the present disclosure.

In FIG. 4, the autonomous braking method includes the following steps.

Step S101 is performed to detect and recognize one or more objects located ahead a vehicle.

Step S102 is performed to trace one or more objects by a tracing module.

Step S103 is performed to define a collision path in accordance with a vehicle dynamic message by a collision path prediction module.

Step S104 is performed to define a possible collision range and a non-collision range in accordance with the collision path and a coordinate of each of the one or more objects.

In step S105, if one or more object are located within the possible collision range, use a memory register to record the coordinate of each object, and predict a collision time by a collision time prediction module; if one object is originally located within the possible collision range, but moves out of the possible collision range and is located within the non-collision range later, then removes its related data from the memory register.

Step S106 is performed to analyze the collision time between the vehicle and the object located in a front lane of the vehicle by a decision module, and use the decision module to determine to provide a warning signal, to pre-brake the vehicle or to automatically brake the vehicle in accordance with different extent of emergency.

In step S107, if the vehicle is changed to a side lane, and the object located in the side lane and in front of the vehicle is also located within the possible collision range, then use the prediction module to determine to provide a warning signal, to pre-brake the vehicle or to automatically brake the vehicle in accordance with the collision time between the vehicle and the object and different extent of emergency.

Step S101 can be performed by the detecting module 101. Similar to the aforementioned embodiments, the detecting module 101 can use the depth capturing unit 101*a* combined with the image capturing unit 101*b*, or the GPS 201*a* combined with the DSRC 201*b*. In one example, the one or more kinds to which the objects belong can be obtained through a recognition code transmitted through the DSRC 201*b*.

In step S105, when one of the objects is originally located within the non-collision range, its data is not recorded.

According to the aforementioned autonomous braking method, the position data of the objects that may cause vehicle collision are all recorded, and then a braking assist is performed in accordance with the collision time between each object and the vehicle, thereby enabling the vehicle to react instantaneously to increase driving safety.

Figure 5:
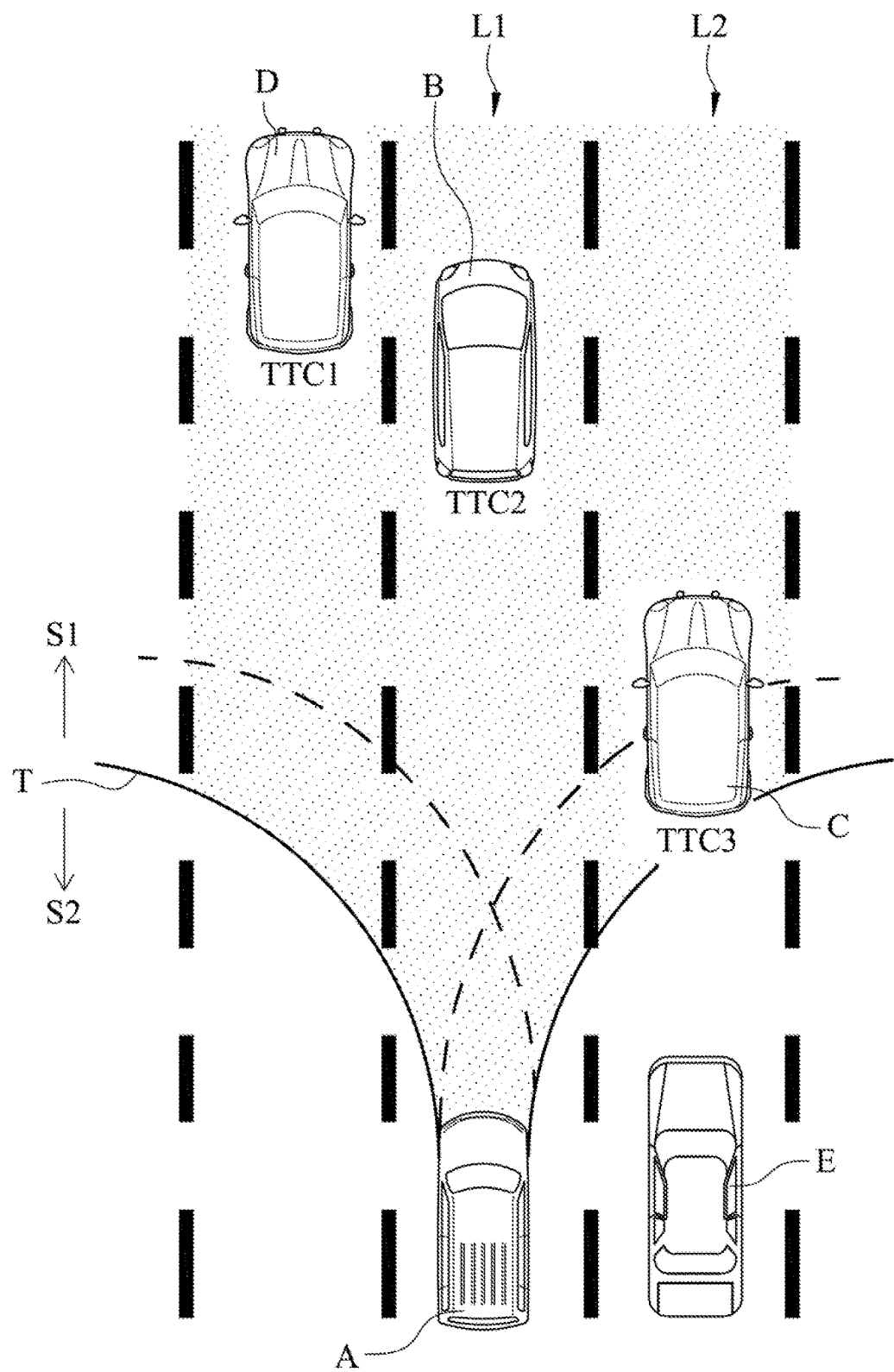
FIG. 5 is a schematic view showing an application example of the autonomous braking system of the present disclosure.
Figure 6:
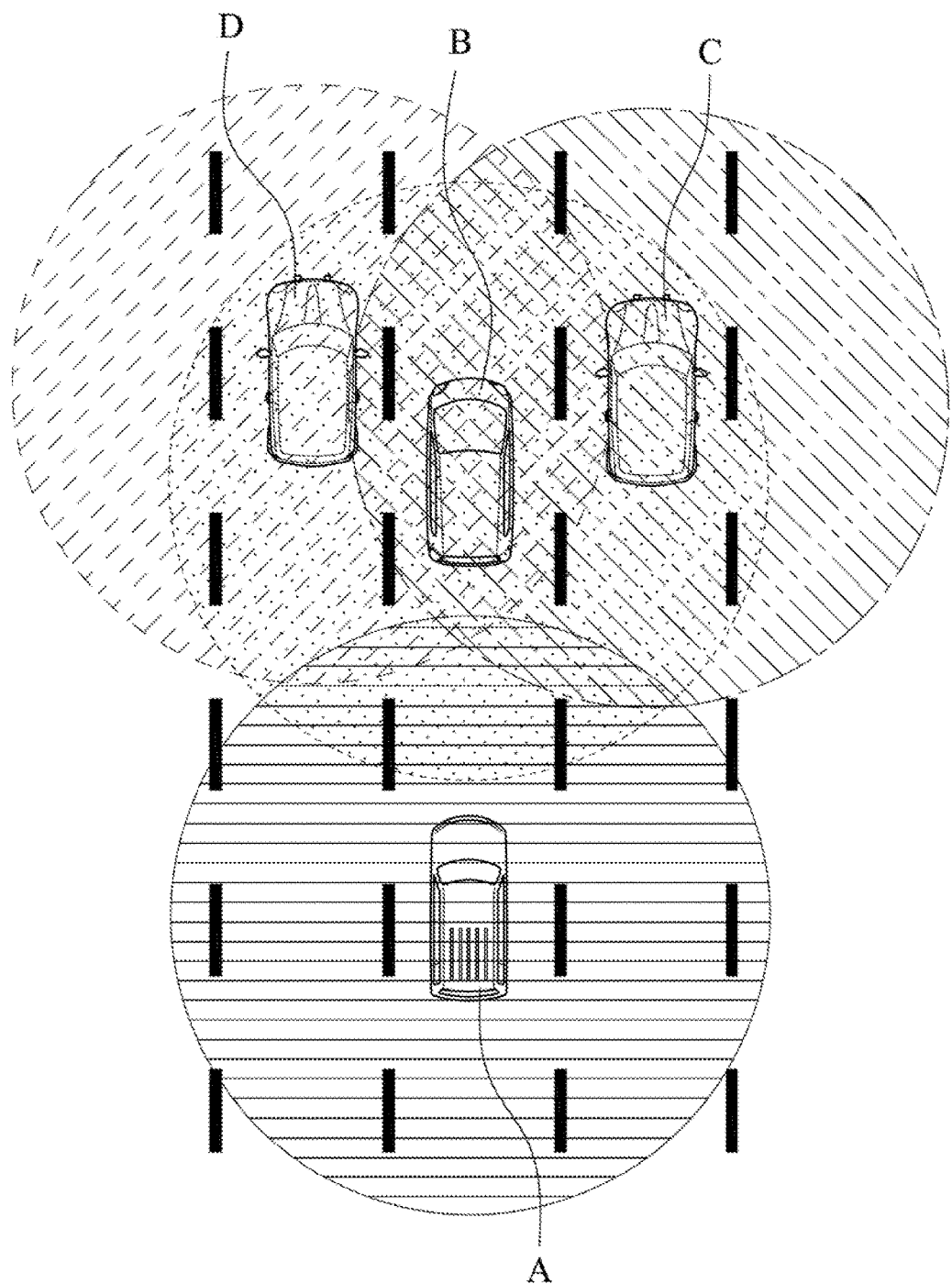
FIG. 6 is a schematic view showing another application example of the autonomous braking system of the present disclosure.

FIG. 5 is a schematic view showing an application example of the autonomous braking system 100 of the present disclosure; and FIG. 6 is a schematic view showing another application example of the autonomous braking system 100 of the present disclosure.

In FIG. 5, the autonomous braking system 100 is installed in a car A. When the car A is moving, the detecting module 101 of the autonomous braking system 100 is first used to detect and recognize the objects located in a front lane L1 and a side (left side or right side) Lane L2. In this case, the objects are all recognized as cars B-E. In another case, each of the objects can possibly be recognized as a motorcycle, a bike or a pedestrian. Then, the tracing module 102 of the autonomous braking system 100 is used to trace and locate the cars B-E which are dynamically moving. Then, the collision path prediction module 103 is used to obtain the collision path T in accordance with the vehicle dynamic message of the car A. As to the car A, it may turn to the right or left, and thus the collision path T is located at both sides of the car A. Then, the possible collision range S1 and the non-collision range S2 are defined in accordance with the collision path T and the position of each of the cars B-E. If one or more cars are located within the possible collision range S1 (e.g. in this case, cars B, C and D are all located within the possible collision range S1), the position coordinates of the cars B-D are recorded in the memory register 106 of the autonomous braking system 100, and then the collision time prediction module 104 is used to predict collision times TTC1, TTC2 and TTC3 between the car A and the cars B~E respectively. If one car is located within the non-collision range S2, its data is not recorded in the memory register 106. If one car which is originally located in the possible collision range S1 moves out of the possible collision range S1 and is located in the non-collision range S2 later, its data is removed from the memory register 106. Then, the decision module 105 of the autonomous braking system 100 determines which actions should be taken. For example, if the car A is positioned correspondently to the car B located in its front lane L1, the decision module 105 may provide a warning signal, pre-brake the car A for decreasing the vehicle speed, or automatically brake even to full stop the car A in accordance with the extent of emergency. In an extreme emergency situation, the driver of the car A may change lane to avoid collision. For example, the car A changes to the right side lane L2. In accordance with the prediction result of the collision path T, when the car A changes to the right side lane L2, the car C located ahead of the car A may also be located within the possible collision range S1, and may also collides the car A. At the time, since the collision time TTC3 is also recorded in the memory register 106 of the autonomous braking system 100, the decision module 105 of the autonomous braking system 100 is activated continuously and determines to provide a warning signal, to pre-brake the car A for decreasing the speed thereof or to automatically brake to fully stop the car A in accordance with the extent of emergency. Until the vehicle located ahead the car A moves out of the possible collision range S1 and is located within the non-collision range S2 by swerving, slowing down the vehicle speed or increasing the vehicle speed, the data of the vehicle is removed from the memory register 106. Therefore, the autonomous braking system 100 of the present disclosure can be continuously activated without requiring to be rebooted, and thus the response speed can be increased, and the driving safety can also be increased.

In FIG. 5, an application example of the autonomous braking system 100 is shown. The detecting module 101 of the autonomous braking system 100 in FIG. 5 combines the depth capturing unit 101a and the image capturing unit 101b to recognize the cars B-E. FIG. 6 demonstrates another application example of the autonomous braking system 100. In FIG. 6, the detecting module 101 of the autonomous braking system 100 uses a GPS 201a combined with a DSRC 201b. It is shown that the detecting ranges in FIG. 6 are different from the detecting ranges in FIG. 5. The application example in FIG. 6 is based on well-developed Vehicle-to-Vehicle communication. For example, in FIG. 6, each of the cars A-D has a detecting module 101, and can transfer the driving messages (such as driving direction, driving speed and driving position) to each other by the DSRC 201b. In an actual case, taking the car A as an example, the latitude and longitude coordinates of each car A-D can be obtained through the GPS 201a disposed in each car A-D. Then, a coordinate transformation is performed to transform a global coordinate system obtained from the GPS 201a of each car A-D to a relative planer coordinate system between the car A and each of the cars B-D, and thus a dynamic relationship (safety relationship) between the car A and each of the cars B-D can be obtained. Furthermore, a recognition code of each car A-D can be used to obtain the kinds to which the cars B-D belong. For example, each of the cars B-D may be a van, a truck, a sedan or a trailer. Steps S102-S107 are then performed to continue the autonomous braking method.

In sum, the autonomous braking system 100 has an advantage of rapid response without requiring to be rebooted during lane changing. The autonomous braking system 100 and the autonomous braking method of the present disclosure have broad application ranges, and are suitable for use in various driving situations, thereby increasing the driving safety.

Although the present disclosure has been described in considerable detail with reference to certain embodiments thereof, other embodiments are possible. Therefore, the spirit and scope of the appended claims should not be limited to the description of the embodiments contained herein.

It will be apparent to those skilled in the art that various modifications and variations can be made to the structure of the present disclosure without departing from the scope or spirit of the disclosure. In view of the foregoing, it is intended that the present disclosure cover modifications and variations of this disclosure provided they fall within the scope of the following claims.

What is claimed is:

1. An autonomous braking system, comprising:
   a detecting module configured to detect and recognize one or more objects located ahead of a vehicle;
   a tracing module configured to trace the one or more objects which are dynamically moving;
   a collision path prediction module configured to predict a collision path between the vehicle and the one or more objects in accordance with a vehicle dynamic message, and to define a possible collision range and a non-collision range in accordance with the collision path and a position of each of the one or more objects;
   a memory register configured to record one or more coordinate positions of the one or more objects which are located within the possible collision range, wherein when multiple objects are located within the possible collision range, one or more coordinate positions of the one or more objects are recorded in the memory register at the same time, and when one of the one or more objects which are originally located within the possible collision range moves out of the possible collision range, its data is removed from the memory register;
   a collision time prediction module configured to predict a collision time between the vehicle and each of the one or more objects; and
   a decision module configured to determine if a brake assist is activated in accordance with the collision time.

2. The autonomous braking system of claim 1, wherein the detecting module comprises:
   a depth capturing unit configured to detect and obtain spatial information of each of the one or more objects;
   an image capturing unit configured to capture one or more images of each of the one or more objects and to perform recognition to obtain image feature information; and
   a composite processing unit configured to receive the spatial information and the image feature information, and to perform a scoring scheme to determine one or more kinds to which the objects belong.

3. The autonomous braking system of claim 1, wherein the detecting module comprises a Global Positioning System (GPS) and a Dedicated Short Range Communication (DSRC), wherein the GPS is used to obtain a latitude and longitude coordinates of the vehicle; the DSRC is used to transmit messages between the vehicle and each of the one or more objects, thereby obtaining a relative position, a relative distance, a relative angle and a relative speed between the vehicle and each of the one or more objects; and one or more kinds to which the one or more objects belong to are obtained through a recognition code.

4. The autonomous braking system of claim 1, when one of objects is originally located within the non-collision range, its data is not recorded.

5. The autonomous braking system of claim 1, wherein the tracing module traces the objects which are dynamically moving through an Extended Kalman Filter, and the Extended Kalman Filter is represented by the following formulas:

$$A = \begin{bmatrix} 1 & 0 & 0 & \cos(\varphi) \times \Delta t \\ 0 & 1 & 0 & \sin(\varphi) \times \Delta t \\ 0 & 0 & 1 & 0 \\ 0 & 0 & 0 & 1 \end{bmatrix}; \hat{x}_{i-1} = \begin{bmatrix} xp_i \\ yp_i \\ \varphi_i \\ v_i \end{bmatrix}; \text{ and } \hat{x}_k^- = A\hat{x}_{i=1};$$

where,
xp$_i$ is an x coordinate of the one or more objects which are dynamically moving;

$yp_i$ is a y coordinate of the one or more objects which are dynamically moving;

$v_i$ is a speed of the one or more objects which are dynamically moving;

$\phi_i$ is a moving direction of the one or more objects which are dynamically moving;

$\Delta t$ is sampling time of a continuous relative position between the vehicle and the one or more objects which are dynamically moving; and A is a state transformation model of the one or more objects which are dynamically moving.

6. The autonomous braking system of claim 5, wherein the collision range is represented by the following formula:

$$y_{obs}^{(i)} > y_l(t) \cap y_{obs}^{(i)} > y_r(t) \cap x_{obs}^{(i)} > x_l \cap x_{obs}^{(i)} < x_r;$$

where $x^{(i)}_{obs}$ and $y^{(i)}_{obs}$ are a horizontal position and a vertical position of each of the one or more objects respectively; and i=1, 2, . . . is the ith object.

7. The autonomous braking system of claim 1, wherein the vehicle dynamic message comprises a lateral speed and a later acceleration speed of the vehicle.

8. The autonomous braking system of claim 1, wherein the collision path located at right side or left side of the vehicle is represent by the following formulas:

$$y_l(t) = \alpha_l x_l^2(t) + \beta_l x_l(t) + \epsilon_l + y_{l0}; \text{ and}$$

$$y_r(t) = \alpha_r x_r^2(t) + \beta_r x_r(t) + \epsilon_r + y_{r0};$$

where, $x_i$, i=l, is a horizontal position at left side of the vehicle;

$x_i$, i=r, is a horizontal position at right side of the vehicle;

$y_i$, i=l, is a vertical position at left side of the vehicle;

$y_i$, i=r, is a vertical position at right side of the vehicle;

$\alpha_i$, i=l, is a lateral speed at left side of the vehicle;

$\alpha_i$, i=r is a lateral speed at right side of the vehicle;

$\beta_i$, i=l, is a lateral acceleration speed at left side of the vehicle; and $\beta_i$, i=r is a lateral acceleration speed at right side of the vehicle.

9. An autonomous braking method, comprising:

detecting and recognizing one or more objects located ahead a vehicle;

tracing one or more objects by a tracing module;

defining a collision path in accordance with a vehicle dynamic message by a collision path prediction module;

defining a possible collision range and a non-collision range in accordance with the collision path and a position of each of the one or more objects;

if one or more object are located within the possible collision range, using a memory register to record the coordinate of each object, and predicting a collision time by a collision time prediction module; if one object is originally located within the possible collision range, but moves out of the possible collision range and is located within the non-collision range later, then removing its related data from the memory register;

analyzing the collision time between the vehicle and the object located in a front lane of the vehicle by a decision module, and using the decision module to determine to provide a warning signal, to pre-brake the vehicle or to automatically brake the vehicle in accordance with different extent of emergency; and if the vehicle is changed to a side lane, and the object located in the side lane and in front of the vehicle is also located within the possible collision range, then using the prediction module to determine to provide a warning signal, to pre-brake the vehicle or to automatically brake the vehicle in accordance with the collision time between the vehicle and the object and different extent of emergency.

10. The autonomous braking method of claim 9, when one of the objects is originally located within the non-collision range, its data is not recorded.

11. The autonomous braking method of claim 9, wherein detecting and recognizing one or more objects located ahead a vehicle is performed by a detecting module.

12. The autonomous braking method of claim 11, wherein the detecting module comprises:

a depth capturing unit configured to detect and obtain spatial information of each of the one or more objects;

an image capturing unit configured to capture one or more images of each of the one or more objects and to perform recognition to obtain image feature information; and a composite processing unit configured to receive the spatial information and the image feature information, and to perform a scoring scheme to determine one or more kinds to which the objects belong.

13. The autonomous braking method of claim 11, wherein the detecting module comprises a Global Positioning System (GPS) and a Dedicated Short Range Communication (DSRC), wherein the GPS is used to obtain a latitude and longitude coordinates of the vehicle; the DSRC is used to transmit messages between the vehicle and each of the one or more objects, thereby obtaining a relative position, a relative distance, a relative angle and a relative speed between the vehicle and each of the one or more objects; and one or more kinds to which the one or more objects belong to are obtained through a recognition code.

14. The autonomous braking method of claim 9, wherein the tracing module traces the dynamically moved objects through an Extended Kalman Filter, and the Extended Kalman Filter is represented by the following formulas:

$$A = \begin{bmatrix} 1 & 0 & 0 & \cos(\varphi) \times \Delta t \\ 0 & 1 & 0 & \sin(\varphi) \times \Delta t \\ 0 & 0 & 1 & 0 \\ 0 & 0 & 0 & 1 \end{bmatrix}; \hat{x}_{i-1} = \begin{bmatrix} xp_i \\ yp_i \\ \varphi_i \\ v_i \end{bmatrix}; \text{ and } \hat{x}_k^- = A\hat{x}_{i=1};$$

where, $xp_i$ is an x coordinate of the one or more objects which are dynamically moving;

$yp_i$ is a y coordinate of the one or more objects which are dynamically moving;

$v_i$ is a speed of the one or more objects which are dynamically moving;

$\phi_i$ is a moving direction of the one or more objects which are dynamically moving;

$\Delta t$ is sampling time of a continuous relative position between the vehicle and the one or more objects which are dynamically moving; and A is a state transformation model of the one or more objects which are dynamically moving.

15. The autonomous braking method of claim 9, wherein the vehicle dynamic message comprises a lateral speed and a later acceleration speed of the vehicle.

* * * * *